United States Patent [19]

Schramm

[11] Patent Number: 4,581,068
[45] Date of Patent: Apr. 8, 1986

[54] SHAPED BODY FOR FEEDING CUPOLA FURNACES

[75] Inventor: Klaus Schramm, Essen, Fed. Rep. of Germany

[73] Assignee: Frank & Schulte GmbH, Essen, Fed. Rep. of Germany

[21] Appl. No.: 730,789

[22] Filed: May 6, 1985

[51] Int. Cl.$^4$ ................................................. C21C 7/00
[52] U.S. Cl. ...................................... 75/130 R; 75/53; 75/57; 75/58; 75/257
[58] Field of Search .................... 75/53, 57, 58, 257, 75/130 R

[56] References Cited

U.S. PATENT DOCUMENTS

| | | | |
|---|---|---|---|
| 3,579,325 | 5/1971 | Stone | 75/57 |
| 3,788,840 | 1/1974 | Koenig | 75/257 |
| 3,957,502 | 5/1976 | Cull | 75/130 R |
| 4,225,343 | 9/1980 | Guarino | 75/130 R |
| 4,248,631 | 2/1981 | More | 75/257 |
| 4,292,075 | 9/1981 | Wolfsgruber | 75/130 R |

Primary Examiner—Peter D. Rosenberg
Attorney, Agent, or Firm—Collard, Roe & Galgano

[57] ABSTRACT

A shaped body for feeding cupola furnaces in the melting of cast iron composed of a silicon carrier as an alloying material, a slag-forming material and free carbon. The silicon carrier is in the form of SiC and/or FeSi. The slag-forming material is made of $SiO_2$, $Al_2O_3$ and CaO. In order to avoid the loss of silicon and have a silicon yield that may be safely controlled without the use of graphite when such bodies are used in unlined hot-blast cupola furnaces with steel scrap proportions in excess of 30% of the charge, the present invention uses free carbon in the form of calcined petroleum-, pitch-, or acicular coke or a combination thereof. Additionally, the ratio of $SiO_2$ to free carbon is in the range of 2–4 and the basicity of the slag-forming material is in the range of 0.2–1.4. A method for using the shaped body in unlined hot-blast cupola furnaces to make cast iron is also disclosed.

7 Claims, No Drawings

SHAPED BODY FOR FEEDING CUPOLA FURNACES

This invention relates to a shaped body for feeding cupola furnaces in the melting of cast iron. More particularly, this invention relates to a shaped body, which contains as an alloying material a silicon carrier in the form of SiC and/or FeSi, a slag-forming material composed of $SiO_2$, $Al_2O_3$ and CaO and, additionally, free carbon.

According to the state of the art, it is known that the controlled siliconizing of cast iron in cupola furnaces with high and varying proportions of steel scrap in the charge is extremely difficult. Frequently, due to cupola loss (oxidation losses) of silicon in various amounts, the silicon yield is so influenced that reproducible results can be achieved only in rare instances.

For reducing the cupola loss, it is generally known to use an alloying material in the form of briquettes, preferably, in the form of cemented shaped bodies. Furthermore, by using a special composition of such shaped bodies, attempts have been made to influence the cupola furnace slag in a favorable way, e.g., U.S. Pat. No. 2,119,521, or to permit the workability of the cast iron and the casting of thin parts without edge hardening and brittle spots, e.g., U.S. Pat. No. 2,527,829. For these purposes, graphite and amorphous carbon have been added to the alloying body, in addition to silicon carbide.

According to the state of the art (e.g., German laid-open Pat. DE-AS 15 83 262), it is also known how to adjust the three-component system $SiO_2$-$Al_2O_3$-CaO in a shaped body to predetermined values in order to achieve a high uniform Si-yield. However, it was found that even with this shaped body, no uniform yield can be achieved if the charge contains high proportions of steel scrap, which is invariably the case in modern cupola furnace operations.

Finally, in order to eliminate this drawback, it is further known (e.g., German laid-open Pat. DE-AS 27 27 896) how to adjust the above-mentioned three-component system (i.e., $SiO_2$-$Al_2O_3$-CaO) to defined values and, furthermore, to add temperature- and oxidation-resistant graphite to the body, namely, graphite in its classical form, i.e., graphite in which the crystals are either visible to the eye or under an optical microscope. However, the use of graphite in the shaped body has the distinct drawback that such graphite is extremely expensive—even more expensive than the actual alloying vehicle in some cases.

Prior to the last discussed proposal, tests were made to add free carbon, in the form of coke breeze, to a three-component system of $SiO_2$-$Al_2O_3$-CaO that had been adjusted in a defined way (report by Böhl presented at the 4th working meeting of the Werner Kessl Company, 8481 Bärnwinkel, on Oct. 4, 1974.) However, even these carefully controlled tests did not consistently lead to satisfactory Si-yields.

Accordingly, it is an object of the present invention to further develop the shaped body of the type specified above so that the silicon loss heretofore known is totally avoided without necessitating the addition of expensive graphite to assure a reliable and controllable yield of silicon.

In particular, it is also an object of the present invention to provide a shaped body that is expected to work reliably in unlined hot-blast cupola furnaces with steel scrap proportions in excess of 30%.

Finally, it is a further object of the invention to provide a shaped body that permits the reproduction of the properties of cast iron, within narrow limits, without the use of costly additives.

Certain of the foregoing and related objects are readily attainable in a shaped body which contains, as the alloying material, a silicon carrier in the form of SiC, FeSi, or a combination thereof; a combination of $SiO_2$, $Al_2O_3$ and CaO as the slag-forming material; and free carbon as a calcined petroleum-, pitch- or acicular coke or a combination thereof, with the ratio of $SiO_2$ to free carbon in the range of 2–4 and, further, where the basicity of the slag-forming material in the body is in the range of 0.2–1.4.

The price of petroleum coke and acicular cokes produced by careful, delayed coking and subsequent calcining at 1200°–1400° C. as well as of pitch coke obtained by coking thermally treated or blown coal-tar pitches has typically been from 50% to 80% less than the price of graphite. Compared to graphite, these materials have no oxidation resistance and they do not have the crystal structure of graphite. Furthermore, because of their optical anisotropy and morphology, they can be readily distinguished from graphite and furnace cokes in polarized light. Moreover, the ash content of furnace coke is ten to twenty times higher.

Surprisingly, it was found that when using this type of carbon material in the shaped body, which is less expensive than graphite and has little oxidation resistance, the resulting silicon yields were as good as those achieved when using graphite if the shaped body contained at least twice as much and up to four times as much $SiO_2$ as free carbon and, furthermore, if the basicity of the slag-forming material in the body, i.e., the ratio of CaO to $SiO_2$, was adjusted to values in the range of between 0.2–1.4. The relatively high $SiO_2$-content can be easily adjusted by adding quartzite or sand. The exact mechanism of the action taking place when the body is melted in the cupola furnace is unknown. Presumably, the calcined petroleum-, pitch- or acicular coke is not prematurely burned at the high temperatures (i.e., temperatures in excess of 2000° C.) on the nozzle level of the cupola furnace. This is because its ash content is extremely low as compared to coke breeze obtained from furnace coke, which means that the grain, which is first enclosed by a protective $SiO_2$-layer, is capable of forming within the marginal zone a protective graphited zone without flaws caused by ash inclusion while being highly heated on the nozzle level of the cupola furnace, which protects the grain until it reaches the slag zone. As a result of the low ash proportions, the petroleum-, pitch- or acicular coke has no slagging tendency. Due to these properties, the carbon from the petroleum-, pitch- or acicular coke is available in the slag zone on the surface of the melt for deoxidizing oxidic components thereby preventing the loss of silicon from the silicon carrier. Furthermore, the carbon contributes to the carbonization of the melt.

According to a first embodiment of the present invention, wherein SiC is used as the silicon carrier, the shaped body has the following composition:
25–60% by weight SiC,
7.5–40% by weight $SiO_2$,
2–14% by weight $Al_2O_3$, and
6–15% by weight CaO;

2.5–20% by weight free carbon in the form of calcined petroleum-, pitch-, acicular coke or a combination thereof, a residue comprising crystal water and common impurities; and wherein the ratio of SiO$_2$ to free carbon is between 3–4 and the basicity of the slag-forming material in the shaped body is between 0.2–0.9.

A binding agent may be employed amounting to 10–20% by weight of the shaped body. Preferably, cement is employed as the binding agent.

The shaped body characterized by this embodiment has a relatively high ratio of SiO$_2$ to free carbon. The alkalinity conforms to the manner in which the furnace is operated, i.e., under conditions ranging from acidic to neutral. The relatively high Al$_2$O$_3$ content may be adjusted by an addition of diabase, basalt or ceramic pieces to neutralize the sulphur content occasionally present in petroleum coke. As is generally known, the sulphur is primarily contained in the slag, if the slag contains a sufficient amount of Al$_2$O$_3$.

According to a second embodiment of the invention, in which FeSi is used as the silicon carrier, the shaped body has the following composition:

20–60% by weight Si from FeSi,
7–25% by weight SiO$_2$,
0.5–5% by weight Al$_2$O$_3$, and
6–15% by weight CaO;
2.5–12% by weight free carbon in the form of calcined petroleum-, pitch-, or acicular coke or a combination thereof, a residue comprising Fe from FeSi, crystal water and common impurities; and wherein the ratio of SiO$_2$ to free carbon is between 2–3 and the basicity of the slag-forming material in the shaped body is between 0.3–1.4.

A binding agent may be employed amounting to 10–20% by weight of the shaped body. Preferably, cement is employed as the binding agent.

It is noteworthy that the shaped body has a low free carbon and SiO$_2$ content. Additionally, the basicity is adjusted to accommodate the operation of the furnace. Smaller amounts of carbon and SiO$_2$ suffice in this case because silicon from FeSi melts at a temperature in the range of 1300° and 1400° C., which means that it is rapidly incorporated into the melt. Silicon carbide, on the other hand, dissociates only at 2200° C. and will only slowly dissolve in the cast iron.

According to another embodiment of the present invention, in which both SiC and FeSi are used as the silicon carrier, the shaped body has the following compositions:

25–40% by weight SiC,
15–40% by weight Si from FeSi,
6–30% by weight SiO$_2$,
1–6% by weight Al$_2$O$_3$, and
6–15% by weight CaO;
2.5–15% by weight free carbon in the form of calcined petroleum-, pitch-, or acicular coke or a combination thereof, a residue comprising Fe from FeSi, crystal water and common impurities; and wherein the ratio of SiO$_2$ to free carbon is between 2–4 and the basicity of the slag-forming material in the shaped body is between 0.2–1.

A binding agent may be emloyed amounting to 10–20% by weight of the shaped body. Preferably, cement is employed as the binding agent.

Very special advantages are gained when using the shaped bodies disclosed above as additives in unlined hot-blast cupola furnaces operated under acidic to neutral conditions for melting cast iron with high and/or varying proportions of steel scrap in excess of 30% of the charge. This is because it has been generally known that the risk of silicon loss is especially great in unlined hot-blast cupola furnaces operated under these conditions since only small amounts of slag were able to be formed, with the major portion of slag being produced only when the shaped bodies melted. The present invention overcomes these drawbacks without a silicon loss, as well as allowing for the possibility of the steel scrap containing a great deal of rust.

In the following examples, the composition of the shaped body of the present invention will be more fully described, however, it should be noted that these examples are given only by way of illustration and not of limitation.

EXAMPLE 1

| 45–60% SiC  | $\frac{SiO_2}{C} = 3$ |
| 2–5% Al$_2$O$_3$ | |
| 10% CaO | $\frac{CaO}{SiO_2} = 0.83$ |
| 12% SiO$_2$ | |

4% carbon in the form of calcined petroleum-, pitch- and acicular cokes.

For unlined hot-blast cupola furnaces operated under neutral conditions with steel scrap proportions of 40 to 60%. The steel scrap proportions may be rusty.

EXAMPLE 2

| 30–45% SiC | $\frac{SiO_2}{C} = 3.18$ |
| 5–14% Al$_2$O$_3$ | |
| 8% CaO | $\frac{CaO}{SiO_2} = 0.23$ |
| 35% SiO$_2$ | |

11% carbon in the form of pitch-, petroleum- and acicular cokes.

For unlined hot-blast cupola furnaces operated under acidic conditions with steel scrap proportions of up to 80%. The steel scrap may be very rusty. The pitch-, petroleum- and acicular cokes used in the body may have a sulphur content of up to 1.5%

EXAMPLE 3

| 40–55% Si from FeSi | $\frac{SiO_2}{C} = 2$ |
| 0.5–2% Al$_2$O$_3$ | |
| 10% CaO | $\frac{CaO}{SiO_2} = 1.25$ |
| 8% SiO$_2$ | |

4% carbon in the form of pitch-, petroleum- and acicular cokes.

For unlined hot-blast cupola furnaces operated under neutral conditions with steel scrap proportions of 40 to 60%. The steel scrap should contain a high proportion of high-grade melting scrap.

EXAMPLE 4

| 25–50% Si from FeSi | $\frac{SiO_2}{C} = 2.78$ |
| 0.5–3% Al$_2$O$_3$ | |

| 8% CaO | $\dfrac{CaO}{SiO_2} = 0.32$ |
| 25% SiO$_2$ | |

9% carbon in the form of pitch-, petroleum- and acicular cokes.

For unlined hot-blast cupola furnaces operated under acidic conditions with steel scrap proportions of up to 80%. The steel scrap should contain a high proportion of high-grade melting scrap.

EXAMPLE 5

| 25-40% SiC | $\dfrac{SiO_2}{C} = 2.4$ |
| 15-30% Si from FeSi | |
| 3-6% Al$_2$O$_3$ | $\dfrac{CaO}{SiO_2} = 1$ |
| 12% CaO | |
| 12% SiO$_2$ | |

5% carbon in the form of pitch-, petroleum- and acicular cokes.

For unlined hot-blast cupola furnaces operated under neutral conditions with steel scrap proportions of 40 to 60%, the steel scrap may be very rusty. The pitch-, petroleum- and acicular cokes used in the shaped body may have a sulphur content of up to 1.5%.

EXAMPLE 6

| 30-40% SiC | $\dfrac{SiO_2}{C} = 3$ |
| 15-30% Si from FeSi | |
| 1-3% Al$_2$O$_3$ | $\dfrac{CaO}{SiO_2} = 0.2$ |
| 6% CaO | |
| 30% SiO$_2$ | |

10% carbon in the form of pitch-, petroleum- and acicular cokes.

For unlined hot-blast cupola furnaces operated under acidic conditions. The steel scrap proportion may be up to 80%.

Furthermore, the shaped bodies according to the present invention offer special advantages when used in hot-blast cupola furnaces operated with secondary blast, in which the hazard of silicon and carbon loss is known to be particularly great. When using the bodies according to the invention in hot-blast cupola furnaces operated with secondary blast, such losses can be safely avoided.

While only several embodiments of the present invention have been shown and described, it is obvious that many changes and modifications may be made thereunto without departing from the spirit and scope of the invention.

What is claimed is:

1. A shaped body for feeding cupola furnaces in the melting of cast iron, comprising:
a silicon carrier selected from the group consisting of SiC, FeSi and a combination thereof;
a slag-forming material selected from the group consisting of SiO$_2$, Al$_2$O$_3$, CaO and a combination thereof, wherein the basicity of said slag-forming material is in the range of 0.2-1.4; and
free carbon selected from the group consisting of calcined petroleum coke, calcined pitch coke, calcined acicular coke and a combination thereof, wherein the ratio of SiO$_2$ to said free carbon is in the range of 2-4.

2. The shaped body according to claim 1, further comprising 10-20% by weight of cement as a binding agent based upon the total weight of said shaped body.

3. The shaped body according to claim 2, wherein said binding agent is cement.

4. The shaped body according to claim 2, wherein, said silicon carrier is 25-60% by weight SiC, said slag-forming material is 7.5-40% by weight SiO$_2$, 2-14% by weight Al$_2$O$_3$, and 6-15% by weight CaO, and has a basicity in the range of 0.2-0.9, and said free carbon is present in an amount of 2.5-20% by weight, wherein the ratio of SiO$_2$ to said free carbon is in the range of 3-4.

5. The shaped body according to claim 2, wherein, said silicon carrier is 20-60% by weight Si from FeSi, said slag-forming material is 7-25% by weight SiO$_2$, 0.5-5% by weight Al$_2$O$_3$, and 6-15% by weight CaO, and has a basicity in the range of 0.3-1.4, and said free carbon is present in an amount of 2.5-12% by weight, wherein the ratio of SiO$_2$ to said free carbon is in the range of 2-3.

6. The shaped body according to claim 2, wherein, said silicon carrier is 25-40% by weight SiC and 15-40% by weight Si from FeSi, said slag-forming material is 6-30% by weight SiO$_2$, 1-6% by weight Al$_2$O$_3$, and 6-15% by weight CaO, and having a basicity in the range of 0.2-1, and said free carbon is present in an amount of 2.5-15% by weight, wherein the ratio of SiO$_2$ to said free carbon is in the range of 2-4.

7. A method for feeding cupola furnaces, having a charge, used in the melting of cast iron, comprising the step of:
adding a shaped body into an unlined hot-blast furnace operated at acidic to neutral conditions with a steel scrap proportion in excess of 30% of the charge, wherein said shaped body comprises a silicon carrier selected from the group consisting of SiC, FeSi and a combination thereof, a slag-forming material selected from the group consisting of SiO$_2$, Al$_2$O$_3$, CaO and a combination thereof, wherein the basicity of said slag-forming material is in the range of 0.2-1.4, and free carbon selected from the group consisting of calcined petroleum coke, calcined pitch coke, calcined acicular coke and a combination thereof, wherein the ratio of SiO$_2$ to said form of free carbon is in the range of 2-4.

* * * * *